United States Patent [19]
Lederer

[11] 3,896,136

[45] July 22, 1975

[54] METHOD FOR PROTECTING AQUEOUS COATING SYSTEMS FROM BACTERIAL ATTACK WITH BENZYL BROMO ACETATE

[75] Inventor: Seymour J. Lederer, Fair Lawn, N.J.

[73] Assignee: Merck & Co., Inc., Rahway, N.J.

[22] Filed: Aug. 15, 1974

[21] Appl. No.: 497,801

Related U.S. Application Data

[63] Continuation of Ser. No. 276,604, July 31, 1972, abandoned.

[52] U.S. Cl. .... 260/29.6 R; 117/161 UZ; 260/17 R
[51] Int. Cl. .......................................... C08f 45/24
[58] Field of Search ................. 260/29.6 R, 29.7 R

[56] References Cited
UNITED STATES PATENTS 2,764,579  9/1956  Seymour ..................... 260/92.8 W
3,400,093  9/1968  Feinberg ...................... 260/29.6 R
3,481,889  12/1969  Gibsen et al. ................. 260/17.4 R

OTHER PUBLICATIONS

Gaynes – Formulation of Organic Coatings, 1967, pp. 15–18.

Heaton – Outlines of Paint Technology, 1947, pp. 390–397.

Nylen/Sunderland – Modern Surface Coatings, 1965, pp. 602, 603, 604, 605, 661, 665.

*Primary Examiner*—Harold D. Anderson
*Attorney, Agent, or Firm*—Edmunde D. Riedl; J. Jerome Behan

[57] ABSTRACT

A method of protecting aqueous paint and coating systems from bacterial attack during storage through the use of benzyl bromoacetate.

2 Claims, No Drawings

METHOD FOR PROTECTING AQUEOUS COATING SYSTEMS FROM BACTERIAL ATTACK WITH BENZYL BROMO ACETATE

This is a continuation of application Ser. No. 276,604 filed July 31, 1972, now abandoned.

This invention relates to a method for protecting aqueous paint and coating systems against bacterial attack. More particularly, this invention relates to the method for protecting aqueous paint and coating formulations against bacterial attack during manufacture and storage which comprises adding to such aqueous paint formulations a bactericidally effective quantity of benzyl bromoacetate.

One of the most important and difficult problems facing the paint industry is preservation of aqueous coating systems against bacterial fermentation during storage. It is well-known that the principal aqueous paint systems in use today are particularly vulnerable to bacterial attack. These systems include coatings based on polyvinyl acetate, butadiene-styrene and acrylic polymers and copolymers. In addition, additives required in the formulation of aqueous coatings also contribute substantially to aiding growth of bacteria. These nutrient sources include thickeners, such as starch, cellulose derivatives, casein and lecithin; and also film plasticizers, coalescents, stabilizers and dispersants. Monomers, by-product salts and organic liquids also are metabolized by bacteria known to attack aqueous paint systems including *Escherichia sp.* such as *E. coli*, *Aerobacter sp.* such as *A. aerogenes*, *Bacillus sp.* such as *B. subtillus* and, principally, *Pseudomonas sp.* such as *P. aeruginosa*.

End results of bacterial attack on aqueous paint systems include foul odor development, marked decrease in visocity, breakdown of the colloid and downward shift in pH. In addition, gas evolution consequent to fermentation often causes large pressure build-up in closed containers resulting in lid blowoff and scattering of contents. It is apparent, therefore, that bacterial attack on aqueous paint systems during storage renders such systems unusable and presents a serious problem for both manufacturer and consumer.

The instant invention is based upon applicant's discovery that aqueous paint and coating systems can be preserved effectively against bacterial attack by incorporating therein a bactericidally effective quantity of benzyl bromoacetate. Applicant has found that benzyl bromoacetate is particularly effective in this application. It provides effective inhibition of bacterial growth at relatively low and economic concentations; it is of low color so that no interference with coating properties occurs and it is relatively low in toxicity and vapor pressure. It is contemplated, therefore, that bactericidally effective quantities of benzyl bromoacetate will be added to aqueous paint systems to insure storage stability during manufacture and to insure long shelf-life stability in the container.

It is well-known that many bromoacetic acid esters are active antimicrobials. Such compounds, including for example 1-bromoacetoxy ethanol-2, bis-1, 4-bromoacetoxy-2-butene and 5,5 -bis-(bromoacetoxymethyl)-m-dioxane, have been suggested for use in controlling microbial problems caused by bacteria in industrial water systems. Particularly, such compounds have been suggested for use as slimicides in paper mills. Further, many bromoacetic acid esters are known to be highly effective fungicides and have been suggested for use as paint additives to control fungal problems.

Surprisingly, applicant has found that benzyl bromoacetate, though a highly effective fungicide, is wholly ineffective in the control of fungal problems relating to aqueous paint systems at economically feasible concentrations while being highly effective in preserving such systems against bacterial attack. These have been confirmed by standard laboratory tests employing the following techniques.

Typical exterior polyvinyl acetate paints having the formulation shown in TABLE 1 below were used in the evaluation.

TABLE 1

| FORMULATION OF EXTERIOR POLYVINYLACETATE PAINT HIGH SPEED DISPERSION | QUANTITY (lb.) |
|---|---|
| Titanium dioxide | 250 |
| Talc | 80 |
| Water | 120 |
| DAXAD 30 (sodium salt of polymerized carboxylic acid) Dewey & Almy Div. W. R. Grace & Co. | 6 |
| Trisodium polyphosphate | 1 |
| 1 CEPAL CO-630 (nonylphenoxypoly (ethyleneoxy) ethanol) General Aniline & Film Corp. | 1.5 |
| Polyethylene glycol | 2 |
| Defoamer | 1 |
| Methocel 3% (Methyl Cellulose CPS 4,000) | 70 |
| REDUCTION | |
| Methyl carbitol | 20 |
| Water | 20 |
| Ethylene glycol | 40 |
| Polyvinylacetate resion emulsion | 425 |
| Methocel 3% (Methyl Cellulose CPS 4,000) | 68.5 |

Samples of this paint formulation were prepared containing benzyl bromacetate in concentrations of 0.025% (250 ppm), 0.05% (500 ppm), 0.1% (1,000 ppm), 0.25% (2,500 ppm), 0.5% (5,000 ppm), 1.0% (10,000 ppm), 2.5% (25,000 ppm) and 5.0% (50,000ppm). An aliquot of each paint was placed in a sterile container to be used in can preservation studies, the balance being reserved for mildew resistance studies.

In order to evaluate the ability of benzyl bromoacetate act as a fungicide in aqueous paint systems, each of the sample described above which had been reserved for this purpose were well stirred and brushed out uniformly on one side of Whatman No. 1 filter paper. A second coat was applied to the same side of the filter paper after 24 hours drying time. After 72 hours drying time following the second coat, 1½ inch × 1½ inch test specimens were cut from the painted paper and subjected to simulated weathering processes using the following cycles is described by Ramp and Grier, Fungicides in Paint, Official Digest, 33, No. 440 (Sept. 1961).

1. Leached/Heated (L/H) - Specimen was leached for 24 hours in running tap water, then heated 24 hours at 65°C.
2. Heated/Leached (H/L) - Specimen was heated for 24 hours at 65°C. then leached 24 hours in running tap water.

The samples were air dried for several hours after treatment, dipped into boiling water and then placed on the surface of plates of malt agar. The test specimens and plates were inoculated with 1.5 ml of a spore suspension of *Pullularia pullulans*. The plates were incubated at 28°–30°C. and evaluated for fungal growth at the end of 4 weeks. The results of these experiments is summarized in TABLE 2 below.

TABLE 2

Evaluation of Benzyl Bromoacetate as an Exterior Paint Mildewcide. Ratings of Paint Films After Four Weeks Incubation.

| Concentration (%) | Rating of Fungal Growth L/H | H/L |
|---|---|---|
| 0.025 | 10 | 10 |
| 0.05 | 10 | 10 |
| 0.1 | 10 | 10 |
| 0.25 | 10 | 10 |
| 0.5 | 10 | 10 |
| 1.0 | 9 | 10 |
| 2.5 | 9 | 10 |
| 5.0 | 5 | 6 |
| Control | 10 | 10 |

Legend: 0 = No growth
1–10 = Trace growth through overgrown ture of a strain of *Pseudomonas aeruginosa* known to degrade aqueous coatings (ATCC 10145) at the rate of 1 ml. of culture per 100 gm. of sample. The inoculated samples were incubated at 28°–30°C. and the microbiological condition of each sample was checked immediately after inoculation and at 4, 24, 48, 72 hours and 7 days after inoculation by streaking on the surface of TGE plates. The plates were incubated at 28°–30°C. for 7 days and examined for growth after this incubation period.

Seven days after the first inoculation, each paint sample was reinoculated with *Pseudomonas aeruginosa* and after incubation at 28°–30°C. for 24, 48, 72 hours and 7 days post inoculation, streaked on TGE plates. These plates were also incubated for 7 days at 28°–30°C. and examined for growth.

Samples which achieved sterility within 48 hours after inoculation and reinoculation, and which were still sterile seven days after inoculation and reinoculation, are considered to be fully preserved. The results of these experiments are summarized in TABLE 3 below.

TABLE 3

Efficacy of Benzyl Bromoacetate as a Preservative in Exterior Polyvinyl Acetate Paint

| Concentration (%) | Time Post-Inoculation | | | | | | Time Post-Reinoculation | | | | |
|---|---|---|---|---|---|---|---|---|---|---|---|
| | 0 | 4 hr | 24 hr | 48 hr | 72 hr | 7D | 4 hr | 24 hr | 48 hr | 72 hr | 7D |
| 0.025 | 3 | 3 | 3 | 0 | 0 | 0 | 3 | 3 | 1 | 0 | 0 |
| 0.05 | 3 | 3 | 3 | 0 | 0 | 0 | 3 | 2 | 0 | 0 | 0 |
| 0.1 | 3 | 3 | 2 | 0 | 0 | 0 | 3 | 1 | 0 | 0 | 0 |
| 0.25 | 3 | 3 | 0 | 0 | 0 | 0 | 3 | 0 | 0 | 0 | 0 |
| 0.5 | 3 | 1 | 0 | 0 | 0 | 0 | 3 | 0 | 0 | 0 | 0 |
| 1.0 | 2 | 0 | 0 | 0 | 0 | 0 | 2 | 0 | 0 | 0 | 0 |
| 2.5 | 1 | 0 | 0 | 0 | 0 | 0 | 1 | 0 | 0 | 0 | 0 |
| 5.0 | 0 | 0 | 0 | 0 | 0 | 0 | 0 | 0 | 0 | 0 | 0 |
| Control | 3 | 3 | 3 | 3 | 3 | 3 | 3 | 3 | 3 | 3 | 3 |

Legend: 0 = No growth
1 = Trace growth - 1 to 6 colonies
2 = Moderate growth - >6 distinct colonies
3 = Heavy growth - indistinct colonies In order to be considered suitable for exterior exposure, paints should show no growth on the film in each of the two treatment cycles after the 4 week incubation period. It will be seen, therefore, that benzyl bromoacetate does not control fungal problems relating to paint systems even at a level of 5%, or 50 lbs/100 gallons of paint, which is many times the level which could be considered economical, even though benzyl bromoacetate is effective at 10 ppm, on Sabourand Maltose Agar, against *Pullularia pullulans*, the organism most commonly identifed with fungal problems of paints, thus, a level of 5%, (50,000 ppm), or 5000 times the level required to control the fungus on agar, does not produce adequate fungal control on the paint film.

In order to evaluate the ability of benzyl bromoacetate to protect aqueous paint systems against bacterial degradation during storage, each of the aliquot samples which has been retained in sterile containers were streaked on the surface of Tryptone Glucose Extract Agar (TGE) to check its bacterial condition. Each sample was then inoculated with a 24-hour old broth cul- As may be seen from the data in TABLE 3, benzyl bromoacetate is wholly effective in protecting water-base paint from bacterial attack at concentrations as low as 0.05% (500 ppm) or one-half lb/100 gallons of paint and is substantially effective at concentrations as low as 0.025% (250 ppm) or one-fourth lb/100 gallons of paint. Thus benzyl bromoacetate is ineffective in control of fungal problems in paint at the 5% level while at one one-hundredth to one two-hundredth of that concentration it effectively preserves aqueous paint systems against bacterial attack.

Benzyl bromoacetate, being liquid, may be incorporated into aqueous paint and coating systems by simple mixing at any stage of the manufacturing process or to the finished product in sufficient quantity so as to give a bactericidally effective concentration in the finished formulation. Further, the benzyl bromoacetate may be added as a component of any of the raw materials employed in the preparation of the finished product. Thus, the benzyl bromoacetate may be added to resin, clay or starch suspensions which are to be employed as components of aqueous paint and coating systems and when employed in this manner serve not only to impart protection against bacterial attack to the finished product but serve also to protect the raw material against bacterial attack during storage.

Effective preservation from bacterial attack in aqueous paint and coating systems usually is achieved by employing from 0.025% to 1.0% by weight of benzyl bromoacetate in the final formulation with concentrations between 0.05 and 0.5% being preferred. At these concentrations, benzyl bromoacetate is compatible with all ingredients commonly employed in the manufacture of water-base paints and coatings and, unlike many currently employed antimicrobials, such as the phenylmercury salts, does not undergo degradation or other reactions with sulfide containing pigments such as lithopone. Moreover, it is fully active at either the acid or alkaline pH conditions which may be selected in any particular formulation for maximum colloid stability.

Another satisfactory method of adding benzyl bromoacetate to aqueous paint and coating systems is by way of an adsorbate of benzyl bromoacetate on finely powdered solid materials employed as dispersants in such systems. Typical dispersants employed for this purpose would include, for example, calcium magnesium silicate, silicone dioxide, clays and talcs. From 10 to 50% by weight of benzyl bromoacetate may be adsorbed on such dispersants by thoroughly blending the benzyl bromoacetate and the powdered dispersant in a suitable mill. The adsorbate then may be added to aqueous paint and coating systems at any desired points in sufficient quantity to give the desired concentration of benzyl bromoacetate in the finished product.

In addition, the benzyl bromoacetate can be added to aqueous paint and coating systems by way of solutions. Benzyl bromoacetate is soluble in many organic solvents such as, for example, xylene, toluene terpentine, perchloroethylene, 2-ethoxyethanol, 2-ethoxyethyl acetate, diethyleneglycol monoethyl ether and the acetate of diethyleneglycol monoethyl ether. Solutions of benzyl bromoacetate in organic solvents which may contain from 1 to 50% of benzyl bromoacetate can be simply stirred into aqueous paint and coating systems to give the desired final concentration. A small percentage of an emulsifying agent, usually between 2 to 5% by weight, may be added to such solutions if desired.

The subject matter which applicant regards as his invention is particularly pointed out and distinctly claimed as follows.

What is claimed is:

1. A method of preserving an aqueous paint and coating formulation susceptible to bacterial attack during storage prior to use against such bacterial attack comprising adding and mixing benzyl bromoacetate to such formulation in an amount such that the preserved formulation, including the benzyl bromoacetate, comprises from 0.025 to 1.00% by weight of benzyl bromoacetate.

2. The method of claim 1 wherein benzyl bromoacetate is added in an amount such that the preserved formulation comprises from 0.05 to 0.5% by weight of benzyl bromoacetate.

* * * * *